Feb. 2, 1971    HIDEO MIYAKE    3,560,059
SEALING DEVICE FOR A HINGE JOINT OF ENDLESS TRACK LINKS
Filed March 13, 1969    2 Sheets-Sheet 1

INVENTOR.
HIDEO MIYAKE
BY Stenberg & Blake
attys

Feb. 2, 1971 HIDEO MIYAKE 3,560,059
SEALING DEVICE FOR A HINGE JOINT OF ENDLESS TRACK LINKS
Filed March 13, 1969 2 Sheets-Sheet 2

INVENTOR.
HIDEO MIYAKE
BY Steinberg & Blake
attys

United States Patent Office 3,560,059
Patented Feb. 2, 1971

3,560,059
SEALING DEVICE FOR A HINGE JOINT OF ENDLESS TRACK LINKS
Hideo Miyake, Osaka-fu, Japan, assignor to Kabushiki Kaisha Komatsu Seisakusho (Komatsu Mfg. Ltd.), Tokyo, Japan
Filed Mar. 13, 1969, Ser. No. 806,797
Claims priority, application Japan, Mar. 21, 1968, 43/21,569; Feb. 4, 1969, 44/9,123; Feb. 8, 1969, 44/10,667
Int. Cl. B62d 55/20
U.S. Cl. 305—11          8 Claims

ABSTRACT OF THE DISCLOSURE

A sealing device for use with a hinge connection structure comprising a pin fixed on a track link of the endless track mechanism and a bushing fixed on an adjacent track link. The pin is received in and surrounded by the bushing with a small clearance therebetween so that an annular space may be formed between the track link on which the pin is fixed and the bushing fixed on the adjacent track link. The sealing device comprises in combination a retainer Z-shaped in cross-section and made of metal or like hard material which has an outer diameter slightly smaller than the inner diameter of said annular recess, and a seal ring made of rubber or like resilient material and formed with at least one lip on its outer circumferential surface so as to form at least one sealed chamber between the lip and the retainer. The retainer is firmly attached to an end face of the bushing so that the retainer may be mounted in the annular recess. The seal ring is mounted in said annular recess such that opposite ends thereof are maintained in contact with the track link and the retainer, whereby the seal ring can be held in place by the retainer and provide a seal to the clearance between the pin and the bushing. The surface of the seal ring maintained in contact with the retainer may have attached thereto a sliding member, which may extend throughout the width of the seal ring, if desired. A lubricant may be contained in the at least one sealed chamber so as to permit the seal ring and the retainer to smoothly move in rotational and sliding motions relative to each other.

BACKGROUND OF THE INVENTION

This invention relates to sealing devices in general. More particularly, the invention is concerned with a sealing device for a hinge joint of endless track links which provides an improved hinge connection and improved means for preventing a link pitch from the elongation for such a connection of the endless track mechanism by precluding the invasion of foreign matters into a clearance between the pin and the bush of the hinge joint structure.

The present invention can have many applications but is especially useful for and will be disclosed herein as applied to the hinge joints of an endless track mechanism of the type commonly employed on crawler vehicles or endless tractors.

In a crawler for such vehicles as tractors or bulldozers, in accordance with the prior art, the endless track mechanism usually comprises a plurality of ground engaging track shoes each of which is secured to a pair of spaced track links pivotally connected to adjacent pairs of track links to form an endless chain. In the endless track chain, a pin is pressed into a bore formed in a link so as to fix the former on the latter. A bushing is pressed into a bore formed in the adjacent link so as to fix the former on the latter firmly. A hinge connection is composed of such a pin inserted into such a bushing. The track chain thus constructed is trained about suitable guiding rollers and a driving sprocket to provide a rail surface for the supporting track rollers to ride thereon. Since there are some rotations of the track chain on the driving sprocket and the guiding rollers when they are engaged with each other, it is necessary to provide suitable clearances between the link and the bushing and between the bushing and the pin so as to adapt the link to be held rotatable on the bushing and to adapt the bushing to be held rotatable on the pin. In addition, it is also necessary thereby to adapt the link to be held somewhat axially slidable on the bushing and to adapt the bushing to be held somewhat axially slidable on the pin.

In the track chain constructed as above in accordance with the prior art, the pin and the bushing are negatively prevented from abrasion by means of quenching their rotating and sliding surfaces so as to provide the case hardening. The track mechanism is subjected, however, to an extremely heavy duty in an environment of a particularly abrasive nature. The clearance between the bushing and the pin is apt to be intruded by fine particles of mud and sand, sea water and muddy water. Such fine particles act on the sliding surfaces as abrasive material so as to accelerate abrasion and corrosion thereof, and as a result, the pitch of the track chain is elongated rapidly so that the bushings are brought into abnormal engagement with the driving sprocket whereby, in turn, rapid deterioration of the sprocket and the bushings is caused.

Accordingly, a primary object of the present invention is to provide a sealing device for a hinge joint structure of endless links which comprises a retainer Z-shaped in cross-section and made of metal or like hard material which is mounted in an annular space formed between an end face of a bushing fixed on a track link of a track shoe of an endless track mechanism and the bottom of a recess formed by providing an offset portion in a link of an adjacent track shoe on which a pin inserted in said bushing is fixed, and a seal ring made of rubber or like resilient material and formed with at least one lip on its outer circumstantial surface which is also mounted in said annular space between said retainer and said bottom of the recess so as to form a sealed chamber between said lip and said retainer, said seal ring being formed with a sliding surface for maintaining sliding contact with said retainer.

Another object of the invention is to provide a sealing device of the type described in which a sliding member made of relatively hard material is attached to said sliding surface of the seal ring, said sliding member being maintained in contact with the retainer along its entire surface.

Another object of the invention is to provide a sealing device of the type described in which a plurality of lips are formed on the outer circumstantial surface of the seal ring, whereby a plurality of sealed chambers are formed by said plurality of lips and said retainer.

Still another object of the invention is to provide a sealing device of the type described in which said sliding member attached to said sliding surface of the seal ring is formed on its surface with at least one cutout whereby its surface is divided into a plurality of sections.

Still another object of the invention is to provide a sealing device of the type described in which a lubricant is contained in said sealed chamber or chambers formed between the lip or lips of the seal ring and the retainer.

A further object of the invention is to provide a sealing device of the type described in which the seal ring is formed with a concavity in its inner circumferential surface so as to permit the ring to accommodate compression breadthwise thereof.

A still further object of the invention is to provide a sealing device of the type described in which said sliding member attached to said sliding surface of the seal ring extends throughout the breadth of the seal ring to the other end thereof.

According to the present invention, there is provided a sealing device for preventing the intrusion of foreign matters, such as mud and dirt, into the clearance between the pin and the bushing of a hinge connection of the endless track mechanism which cause abrasion of the sliding surfaces of the pin and the bushing, which is adapted to be mounted in an annular space formed between the bottom of a recess formed by providing an offset portion in a track link on which the pin is fixed and an end surface of the bushing fixed on an adjacent track which surrounds said pin, said sealing device being useful in preventing the lubricant applied to the clearance between the pin and the bushing from leaking to outside and at the same time in preventing foreign matters, such as muddy water, sand and dirt, from working their way into the clearance and thereby causing wear and tear of the sliding surfaces of the pin and the bush.

Additional objects and advantages of the invention will become apparent from the description set forth hereunder when considered in conjunction with the accompanying drawings.

DESCRIPTION OF THE PREFERRED EMBODIMENTS

In order to enable the present invention to be better understood, a hinge joint of endless track links and conventional seals used therein will be explained first of all.

Figure 1:
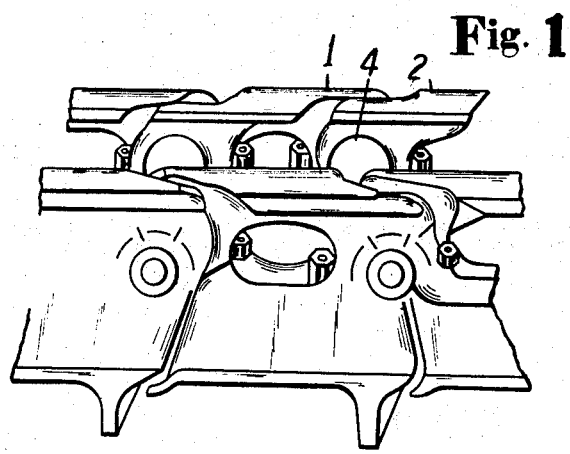
FIG. 1 is a fragmentary perspective view of an endless track mechanism in which the sealing device according to this invention can be incorporated.
Figure 2:
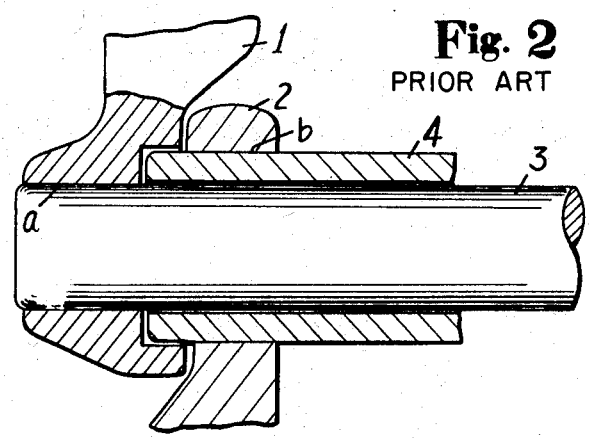
FIG. 2 is a fragmentary, enlarged, sectional front view of the endless track mechanism shown in FIG. 1.

As shown in FIGS. 1 and 2, the hinge connection of endless track links constituting an endless track mechanism for such vehicle as tractors or bulldozers comprises a pin 3 fixed on one track link 1 at a portion a, and a bushing 4 fixed on an adjacent track link 2 at a portion b. Because of this arrangement, the pin and the bushing perform more or less relative rotational and sliding movements when the particular track links pass by the driving sprocket, guiding wheels and upper and lower track rollers during the travel of the vehicle. Particularly, there develops a high surface pressure between the pin 3 and the inner surface of the bushing 4 while the vehicle is travelling, and the pin and the bushing move in rotational and sliding motions on each other in this condition. Thus, the phenomenon results of heat generation or wear of the sliding surfaces in contact with each other.

In addition, the clearance between the pin 3 and the bushing 4 is apt to be intruded by fine particles of mud, sea water or sand, which act on the sliding surfaces as abrasive material so as to accelerate wear, and as a result, the pitch of the track chain is rapidly elongated. This causes the bushings to be brought into abnormal engagement with the driving sprocket, with a result that the teeth of the sprocket and the bushings undergo abnormal wear and tear. With the sprocket and the bushings in this condition, they fail to function effectively and the vehicle is rendered inoperative.

Figure 3:
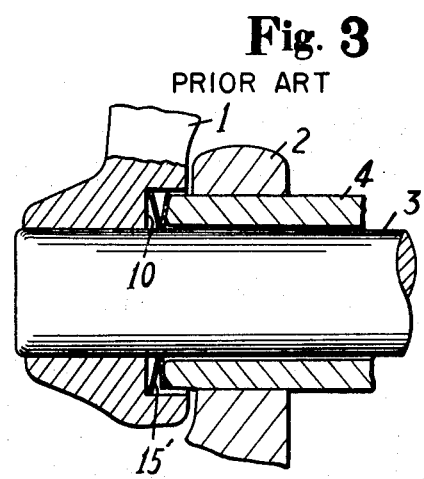
FIG. 3 is a fragmentary, enlarged, sectional front view of the endless track mechanism shown in FIG. 1 in which one form of conventional seal is incorporated.
Figure 4:
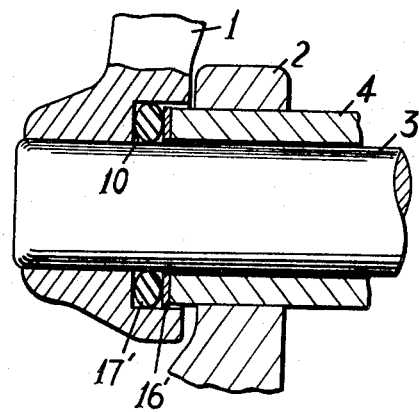
FIG. 4 is a fragmentary, enlarged, sectional front view of the endless track mechanism shown in FIG. 1 in which another form of conventional seal is incorporated.

In order to prevent wear and tear of the pin and the bushing, it has hitherto been customary to quench the outer periphery of the pin 3 and the inner and outer peripheries of the bushing 4 so as to provide case hardening. In recent years, attempts have been made to provide means to prevent the elongation of the pitch of the track chain and some of them have been carried into practice. Such means include a combination of two saucer springs 15 made of metal as shown in FIG. 3 or a combination of a ring 16 made of metal and an O-ring 17 made of rubber or other resilient material as shown in FIG. 4, each of such combinations being mounted in a recess formed in the link 1 between the bottom 10 of the recess and the end face of the bushing 4. These seal means bear against the end face of the bushing 4 with a great force and the seal means and the bushing inevitably move in sliding motion relative to each other, thereby causing wear and tear on the contact surfaces thereof. Thus, the seal means fail to function effectively and cannot achieve desired results in providing a seal.

Figure 5:
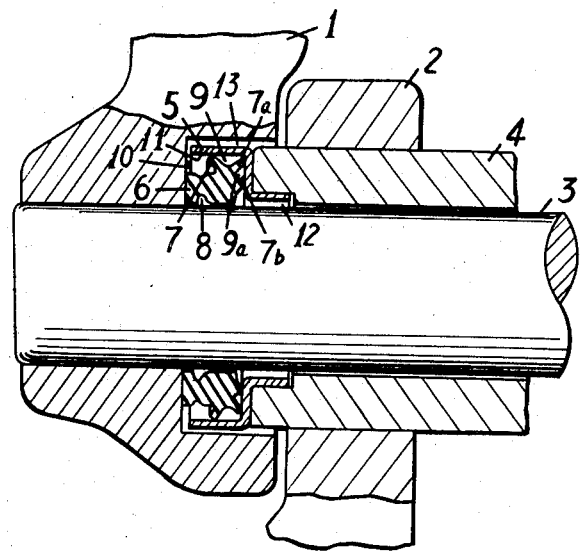
FIG. 5 is a fragmentary, enlarged, sectional view of the endless track mechanism shown in FIG. 1 in which a first embodiment of the sealing device according to this invention is incorporated.

The present invention provides an improved sealing device which can obviate the aforementioned defects of the conventional seal means. The invention will first be explained with reference to a first embodiment illustrated in FIG. 5. In the embodiment illustrated, a retainer 5 Z-shaped in cross-section and made of stainless steel or like hard material is firmly attached to the bushing 4 by fitting its vertical member and lower horizontal member over an end face and an inside offset portion of the bushing respectively, so that the retainer is disposed in the annular space defined by said end face of the bushing 4 fixed on the track link 2 and the bottom 10 of the recess formed in the adjacent track link 1 by providing an offset portion 13 therein. A seal ring 6 made of rubber or like resilient material and formed on its outer circumferential surface with lips 7, 7a and 7b is inserted in said annular space between the bottom 10 of the recess and one surface of the vertical member of the retainer 5 opposite to the other surface thereof on which the retainer is fitted over the end face of the bushing 4, so that said seal ring 6 is maintained in contact with the bottom 10 and said one surface of the vertical member of the retainer 5. Thus, the clearance between the pin 3 and the bush 4 is sealed by the seal ring 6 which is held in place by the retainer 6 and in sliding contact therewith at the lips 7, 7a and 7b in engagement with the inner surface 11 of the upper horizontal member and said one surface of the vertical member of the retainer 5. Sealed chambers 9 and 9a defined by the lips 7 and 7a and said inner surface of the upper horizontal member of the retainer 5 and the lips 7a and 7b and said one surface of the vertical member of the retainer 5 respectively may contain a lubricant therein to thereby facilitate the relative sliding motion of the seal ring 6 and the retainer 5.

The embodiment of the sealing device comprising the retainer 5 and the seal ring 6 arranged in the manner described hereinabove provides a small clearance between the offset portion 13 formed in the track link 1 and the outer surface of the upper horizontal member of the retainer 5 and offers a labyrinth effect, whereby the intrusion of foreign matters from outside can be prevented. Since the lips 7, 7a and 7b of the seal ring 6 and the inner surface of the upper horizontal member of the retainer 5 are in engagement with each other, a seal is provided therebetween, thereby effectively preventing the intrusion of foreign matters into the clearance between the pin 3 and the bush 4.

It will be evident that the sealing device embodying the present invention is effective to prevent the leak to outside of a lubricant applied to the clearance between the pin 3 and the bush, the invasion into said clearance of foreign matters from outside, and the wear and tear of the end face of the bushing 4.

The seal ring 6 can have a prolonged service life, because its excessive deformation by compression can be prevented by the end of the upper horizontal portion of the retainer 5 impinging on the bottom 10 of the recess formed in the link 1 when the bushing 4 is moved axially in thrust motion while the vehicle is travelling. The seal ring 6 is formed with a concavity 8 in its inner circumferential surface which permits the seal ring to be compressed and deformed to a certain degree when a thrust load is applied thereto. This arrangement is also conducive to a prolonged service life of the seal ring.

In view of the foregoing, it will be evident that the sealing device embodying the present invention obviates all the disadvantages of seals of the prior art and thereby brings about an increased performance and a prolonged service life of the endless track mechanism.

Now, second, third, fourth and fifth embodiments of the sealing device according to the present invention will be explained with reference to FIGS. 6A, 6B, 6C and 6D.

Figure 6:
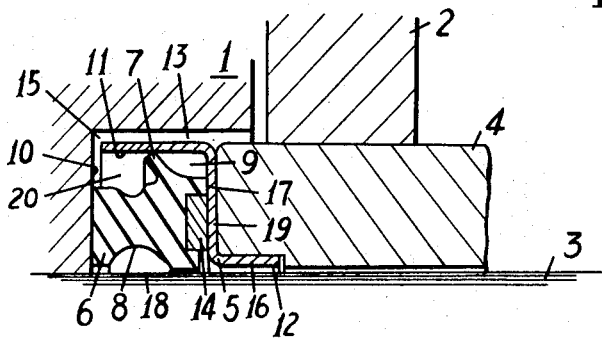
FIGS. 6A, 6B, 6C and 6D are fragmentary, enlarged, sectional front views of the endless track mechanism shown in FIG. 1 in which second, third, fourth, and fifth embodiments respectively of the sealing device according to this invention are incorporated.
Figure 6:
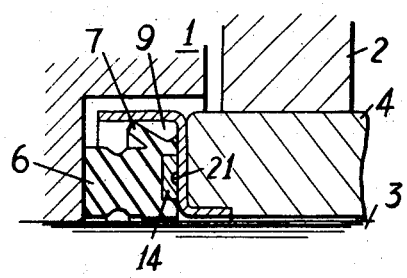

The sealing device as illustrated in FIG. 6A comprises the retainer 5 Z-shaped in cross-section and made of metal or like hard material which is mounted on the bushing 4 by fitting its vertical member and the lower horizontal member over the end face and the inside offset portion 12 of the bushing 4 respectively so that the retainer 5 may be disposed in the annular space 20 defined by the end face of the bushing 4 fixed on the track link 2 and the bottom 10 of the recess formed in the adjacent track link 1 by providing the offset portion 13, and the seal ring 6 made of rubber or like resilient material and formed on its outer circumferential surface with at least one lip 7 which is disposed in the annular space 20 inwardly of the retainer 5. The seal ring 6 includes a sliding member 14 made of metal, nylon resin or like material of high abrasion resistance and low co-efficient of friction which is attached to the sliding surface 17 of the sealing ring 6. The sliding member 14, which is hardened by treating with a synthetic resinous material is maintained in contact with the retainer 5 along its entire contact surface. The seal ring 6 is mounted such that one end thereof is maintained in contact with the bottom 10 of the recess formed in the link 1 by providing the offset portion 13 and the other end surface thereof 17 to which the sliding member 14 is attached is maintained in contact with the vertical member of the retainer 5. The lip 7 is maintained in contact with the inner surface of the upper horizontal member of the retainer 5 so as to define the chamber 9 therebetween in which a lubricant is contained.

The embodiment of the sealing device comprising the retainer and the seal ring 6 arranged in the manner described hereinabove provides a small clearance between the offset portion 13 formed in the track link 1 and the outer surface of the upper horizontal member of the retainer 5 and offers a labyrinth effect, whereby the invasion of foreign matters from outside can be prevented. The lip 7 of the seal ring 6 is maintained in contact with the inner surface of the upper horizontal member of the retainer to provied a seal to the clearance between the pin 3 and the bushing 4, whereby the invasion of foreign matters thereinto can effectively be prevented. At the same time, the sliding member 14 attached to the end surface 17 of seal ring 6 is maintained in sliding contact with the vertical member of the retainer 5 for relative sliding motion, whereby the abrasion of the seal ring 6 can be prevented.

In the embodiment of the sealing device shown in FIG. 6B, the sliding member 14 is formed with at least one cutout 21 for containing a lubricant therein, so that the contact surface of the sliding member 14 in contact with the vertical member of the retainer 5 is divided into a plurality of sections. This arrangement is conducive to increased resistance to abrasion of the seal ring 6 and at the same time to increased effectiveness of the lubricant contained in the chamber 9 defined by the lip 7 and the retainer 5.

The embodiment of the sealing device illustrated in FIG. 6C is formed with a plurality of lips 7 so that a plurality of chambers 9 may be formed. This arrangement makes it possible to still more effectively prevent the intrusion of foreign matters into the clearance between the pin 3 and the bush 4.

The embodiments of the sealing device described above can prevent the leak to outside of the lubricant contained in the clearance between the pin 3 and the bush 4, permitting the two elements to smoothly move in pivotal motion. In addition, the embodiments can effectively prevent the intrusion from outside of foreign matters, such as muddy water and fine particles of sand, into the clearance between the pin 3 and the bushing 4, thereby preventing abrasion of the surfaces of the pin 3 and the bushing 4 in contact with each other.

The embodiments of the sealing device described above are also constructed such that movement of the pin 3 or the bushing 4 axially thereof brings the end of the upper horizontal member of the retainer 5 into abutment with the bottom 10 of the recess formed in the track link 1 by the provision of the offset portion 13, thereby preventing the compression and deformation of the seal ring 6. The seal ring 6 is thus free from the danger of being compressed and broken by the thrust load applied thereto, so that the seal ring 6 can maintain its resilience for a prolonged period of time and consequently have a long service life.

The seal ring 6 of the embodiment shown in FIG. 6D is formed such that the inner circumferential surface 22 of the seal ring 6 is in contact with the peripheral surface of the pin 3. Preferably, the seal ring 6 is formed with the concavity 8 in its inner circumferential surface as is the case with the embodiment shown in FIG. 5 so that the seal ring can better absorb the compressive force applied axially of the bushing 4.

Figure 7:
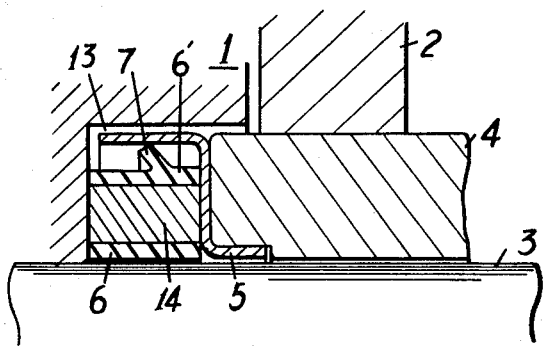
FIG. 7 is a fragmentary, enlarged, sectional front view of the endless track mechanism shown in FIG. 1 in which a sixth embodiment of the sealing device according to this invention is incorporated.
Figure 6:
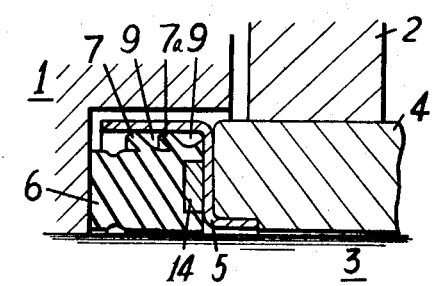
Figure 6:
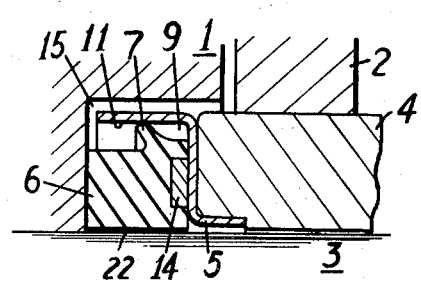

In the embodiment of the sealing device shown in FIG. 7, the seal ring is formed such that the sliding member 14 extends throughout the width of the seal ring which is divided into an upper and lower seal ring members 6, 6'. Thus, the upper and lower seal ring members 6, 6' and the sliding member 14 form a seal ring assembly. Opposite ends of the seal ring assembly are maintained in contact with the bottom of the recess formed in the track link 1 by providing the offset portion 13 and the vertical member of the retainer 5 attached to the bushing 4. This arrangement permits the pin 3 and the bushing 4 to smoothly move in sliding and rotary motions relative to each other. The arrangement is also effective in bearing the axial thrust of the pin 3 or the bushing 4.

The resilient seal ring members 6, 6' bear against the same surfaces as the sliding member 14 is maintained in contact with, and the lip 7 formed on the circumferential surface of the upper seal ring member 6' bears against the inner surface of the upper horizontal member of the retainer 5, whereby a complete seal is provided to the clearance between the pin 3 and the bush 4 so as to effectively prevent the intrusion of mud, sea water or fine particles of sand thereinto.

From the foregoing description, it will be appreciated that the sealing device according to this invention is excellently suited for use in a hinge joint of endless track links. The device is simple in construction and yet capable of providing a seal and bearing a thrust applied to the hinge connection.

Preferably, the seal ring assembly including the seal ring members 6, 6', the sliding member 14 interposed between said seal ring members, and the lip 7 formed on the circumferential surface of the upper seal ring member 6' is made such that the overall height of the assembly as measured from the tip of the lip 7 to the circumferential surface of the lower seal ring member 6 is greater than the height of the vertical member of the retainer 5 before the assembly is mounted in the annular space between the track link 1 and the bushing 4. If the assembly is dimensioned as aforementioned, the seal ring assembly will bear against the retainer 5 with a great force by virtue of the resilience of the upper seal ring member 6' when built into the annular space.

What is claimed is:

1. A sealing device for a hinge joint of endless track links which is adapted for use in a connecting structure comprising a pin and a bushing interfitted one into the other with a clearance therebetween, said pin being pressed into a bore formed in a track link so that the former may be fixed on the latter and said bushing being pressed into a bore formed in an adjacent track link so that the former may be fixed on the latter, an annular space being formed between the bottom of a recess formed by providing an offset portion in said track link on which said pin is fixed and an end face of the bushing of said adjacent track link which surrounds said pin, said sealing device comprising in combination a retainer Z-shaped in cross-section and made of metal or like hard material which comprises an upper horizontal member, a vertical member and a lower horizontal member and has an outer diameter slightly smaller than the inner diameter of said annular recess, and a seal ring made of rubber or like resilient material and formed with at least one lip on its outer circumferential surface, said retainer being firmly attached to said end face of said bushing by fitting said vertical member and said lower horizontal member over the end face and an inside offset portion of the bushing respectively so that said upper horizontal member may extend into the annular recess, said ring being mounted in the annular recess such that opposite ends thereof are maintained in contact with said bottom of the recess formed in the track link and said vertical member of the retainer firmly attached to the end face of the bushing respectively and the lip thereof is maintained in contact with said upper horizontal member of the retainer so as to form at least one sealed chamber therebetween, a sliding surface being formed in said seal ring for maintaining sliding contact with said vertical member of the retainer.

2. A sealing device as defined in claim 1 in which a sliding member made of hard material is mounted on said sliding surface of the seal ring, said sliding member being in sliding contact with the vertical member of the retainer along its entire contact surface.

3. A sealing device as defined in claim 2 in which a plurality of lips are formed on the outer circumferential surface of the seal ring, said plurality of lips being maintained in contact with said upper horizontal member of the retainer so as to form a plurality of sealed chambers therebetween.

4. A sealing device as defined in claim 2 in which said sliding member extends throughout the width of the seal ring.

5. A sealing device as defined in claim 3 in which said sliding surface of the seal ring is hardened by treating the same with a suitable material.

6. A sealing device as defined in claim 3 in which at least one cutout is formed in the contact surface of the sliding member so as to divide the contact surface into a plurality of sections, said cutout being filled with suitable lubricant.

7. A sealing device as defined in claim 3 in which a lubricant is contained in said sealed chambers.

8. A sealing device as defined in claim 7 in which a convexity is formed in the inner and/or outer circumferential surface of the seal ring.

References Cited

UNITED STATES PATENTS

| | | | |
|---|---|---|---|
| 2,341,900 | 2/1944 | Boden | 305—11UX |
| 3,244,457 | 4/1966 | Ross | 305—11 |
| 3,341,259 | 9/1967 | Schulz | 305—11 |

RICHARD J. JOHNSON, Primary Examiner

U.S. Cl. X.R.

277—92